United States Patent [19]
Sinibaldi et al.

[11] Patent Number: 5,883,925
[45] Date of Patent: Mar. 16, 1999

[54] PULSE CODE MODULATION COMPRESSION MECHANISM

[75] Inventors: John Claude Sinibaldi, Pompano Beach; Baiju Dhirajlal Mandalia, Boca Raton; William Robert Robinson, Jr., West Palm Beach; Lawrence Paul Andrews, Boca Raton, all of Fla.

[73] Assignee: International Business Machines Corporation, Armonk, N.Y.

[21] Appl. No.: 559,000

[22] Filed: Nov. 16, 1995

[51] Int. Cl.$^6$ .................................................. H04B 1/66
[52] U.S. Cl. ........................................................ 375/241
[58] Field of Search .................................. 375/241, 242, 375/240; 341/50, 108, 145; 348/384, 410

[56] References Cited

U.S. PATENT DOCUMENTS

| | | |
|---|---|---|
| 4,231,022 | 10/1980 | Kosugi et al. . |
| 4,404,544 | 9/1983 | Dwarakanath . |
| 4,519,073 | 5/1985 | Bertocci et al. . |
| 4,610,018 | 9/1986 | Rabaey et al. ............................ 375/242 |
| 4,837,677 | 6/1989 | Burrus, Jr. et al. . |
| 4,864,566 | 9/1989 | Chauveau . |
| 5,016,009 | 5/1991 | Whiting et al. . |
| 5,060,227 | 10/1991 | Finley et al. . |
| 5,146,221 | 9/1992 | Whiting et al. . |
| 5,155,485 | 10/1992 | Sako et al. . |
| 5,212,481 | 5/1993 | Ichihara . |
| 5,237,572 | 8/1993 | Badaouia et al. . |
| 5,291,614 | 3/1994 | Baker et al. . |
| 5,396,536 | 3/1995 | Yudkowsky . |
| 5,649,148 | 7/1997 | Gresham ................................ 395/275 |

OTHER PUBLICATIONS

ISDN Primary Rate Interface with Multiple Protocol Support and Scalable Performance, TDB n11 Apr. 1992 pp. 401–404, Saalmueller, J., Germany Disclosure #: GE8–91–0143.

ISDN Port Adapter, G. T. Davis, Oct. 13, 1994, pp. 1–16.

Dialog(R) File 351:Derwent WPI, 1995 Derwent Info Ltd., (Item 6 from file: 351), WPI Acc No: 90–368384/49, Patent Assignee: Norand Corp, Author: K. K. Cargin, et al., US 4972463 A, Abstract.

Dialog(R) File 347:JAPIO(Item 1 From file: 347), Pub. No.: 05–292154 [JP 5292154 A], Published: Nov. 5, 1993(19931105)N. Kenji, et al, Applicant: Digital KK[491412](a Japanese company or Corporation) Appl. No.: 03–284510 [JP 91284510] Filed: Oct. 30, 1991 (19911030) Abstract.

International Telecommunication Union, CCITT, General Aspects of Digital Transmission Systems Terminal Requirements, Recommendation G.711, vol. III, Fascicle 111 4, pp. 175–183 (Pulse Code Modulation (PCM) of Voice Frequencies–Geneva, 1972; Further Amended.

Texas Instruments, Digital Signal Processing Applications with the TMS320 Family, Theory, Algorithms, and Implementations, 1986, Digital Signal Processor Products, pp. 171–181.

The Guide to T–1 Networking, How to Buy, Install and Use T–1, from Desktop to DS–3, Fourth Edition, Published by Telecom Library Inc., Chapter 3, Digital Voice pp. 29–34.

*Primary Examiner*—Temesghen Ghebretinsae
*Attorney, Agent, or Firm*—Gunster, Yoaklev, Valdes-Fauli & Stewart

[57] ABSTRACT

A pulse code modulation (PCM) unit is connected to a bus in a computer system. Also, connected to the bus is a processor and memory. The PCM unit is connected to transmit and receive telephone lines. The PCM unit reads uncompressed PCM data from the memory over the bus and compresses the PCM data for transmission over the telephone line in a cycle steal operation, wherein the bus is not being used by the processor. The PCM receives compressed PCM data from the receive telephone line, decompresses it, and writes the decompressed PCM data to the memory in a cycle steal operation. In addition, selectivity of either $\mu$-Law or A-Law conversion, selectivity of even bit inversion for A-Law conversion, and selectivity between the compressed/decompressed PCM data or raw data is provided on a per channel basis. Selectable linear gain is also provided.

25 Claims, 14 Drawing Sheets

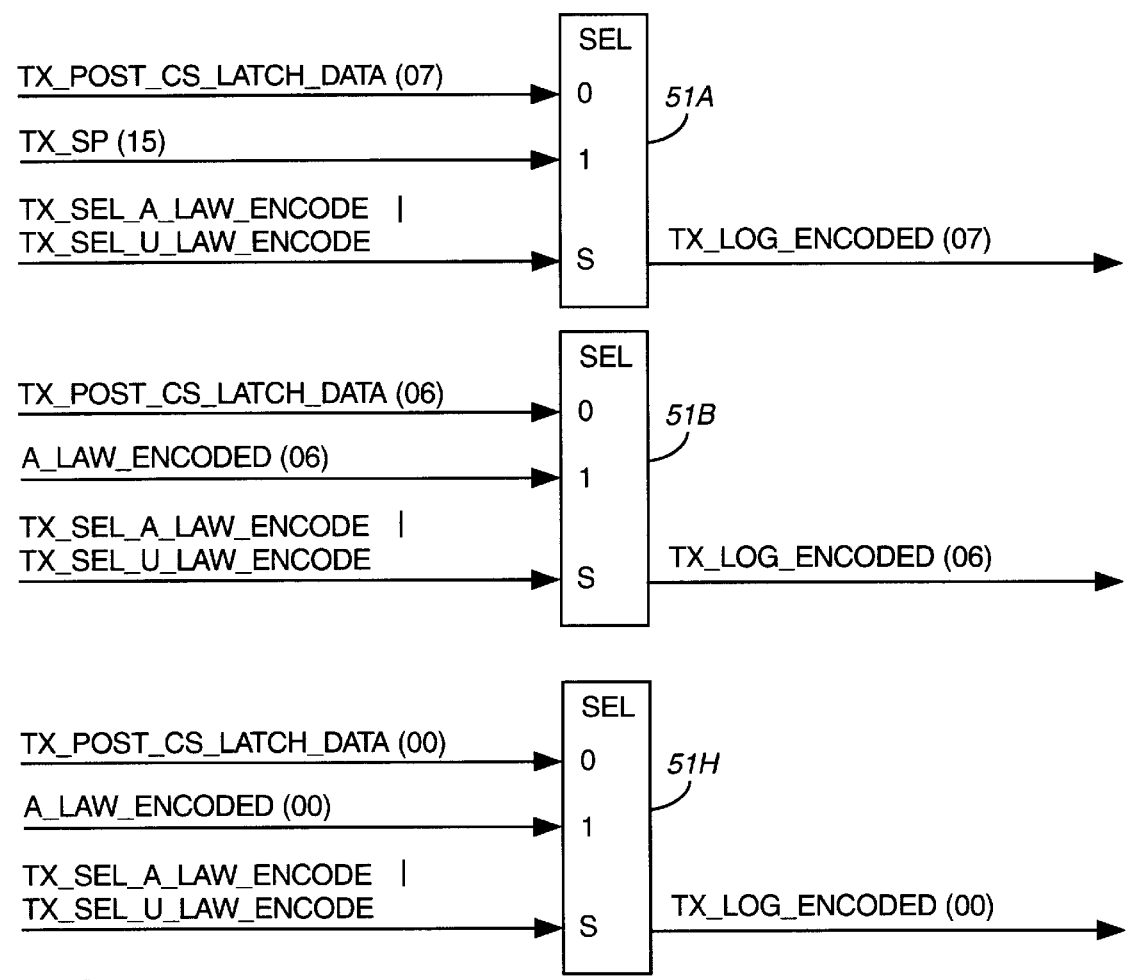

WHERE

TX_REQ_A_LAW_ENCODE = (A_LAW_ENABLE (31) & TX_CS_ATS (31) |
         (A_LAW_ENABLE (30) & TX_CS_ATS (30) |

• • •

(A_LAW_ENABLE (00) & TX_CS_ATS (00)

TX_REQ_A_LAW_ENCODE = (U_LAW_ENABLE (31) & TX_CS_ATS (31) |
         (U_LAW_ENABLE (30) & TX_CS_ATS (30) |

• • •

(U_LAW_ENABLE (00) & TX_CS_ATS (00)

TX_SEL_A_LAW_ENCODE = TX_REQ_A_LAW_ENCODE & !TX_REQ_U_LAW_ENCODE
TX_SEL_U_LAW_ENCODE = TX_REQ_U_LAW_ENCODE & TX_-REQ_A_LAW_ENCODE
TX_SEL_SIGN_PROCESSED = TX_SEL_U_LAW_ENCODE |
         TX_SEL_A_LAW_ENCODE
TX_CS_ATS   = TX CS ACTIVE TIME SLOT STATUS REG   X'00B4'.X'00B6'

*FIG. 7*

|  | RX_LIN_DECODEDG (15:0) | | |
|---|---|---|---|
|  | GS (10) = (10)B | GS (10) = (01)B | GS (10) = (00)B |
| RX_LIN_DECODED (15) | 15 | 15 | 15 |
| RX_LIN_DECODED (14) | 14 | 0 | 0 |
| RX_LIN_DECODED (13) | 13 | 14 | 0 |
| RX_LIN_DECODED (12) | 12 | 13 | 14 |
| RX_LIN_DECODED (11) | 11 | 12 | 13 |
| RX_LIN_DECODED (10) | 10 | 11 | 12 |
| RX_LIN_DECODED (09) | 09 | 10 | 11 |
| RX_LIN_DECODED (08) | 08 | 09 | 10 |
| RX_LIN_DECODED (07) | 07 | 08 | 09 |
| RX_LIN_DECODED (06) | 06 | 07 | 08 |
| RX_LIN_DECODED (05) | 05 | 06 | 07 |
| RX_LIN_DECODED (04) | 04 | 05 | 06 |
| RX_LIN_DECODED (03) | 03 | 04 | 05 |
| RX_LIN_DECODED (02) | 02 | 03 | 04 |
| RX_LIN_DECODED (01) | 01. | 02 | 03 |
| RX_LIN_DECODED (00) | 00. | 01. | 02 |

OUTPUT TO SIGN PROCESS

*FIG. 13*

PULSE CODE MODULATION COMPRESSION MECHANISM

TECHNICAL FIELD OF THE INVENTION

The present relates to a method and apparatus for compressing and decompressing pulse code modulated data.

BACKGROUND OF THE INVENTION

Pulse Code Modulation (PCM) is commonly used for communications. For example, much of the telephone data (voice, video) that is transmitted digitally is transmitted with the data in PCM format over T1 telephone lines.

PCM data is generated by sampling the amplitude of an analog signal and then digitally encoding the sample signal. When PCM data is transmitted over a telephone line, each data word is converted from 13 into 8 bits using nonlinear compression techniques. Two widely used conversion standards are $\mu$-Law (for North America and Japan) and A-Law (for the rest of the world). A-Law and $\mu$-Law conversion compress the data logarithmically, wherein low and normal volume levels of the signal are sampled with greater amplitude resolution than are high volume levels. Once the PCM data is generated and compressed, it can readily be sent over T1 telephone lines (or E1 TDM lines).

Computer systems are often connected to T1 telephone lines in order to communicate with other systems. For example, Digitized Analog Data can be sent in PCM form over T1 lines from one computer system to another computer system. The computer system processes the data in a decompressed or linear form. Thus, when PCM data is to be transmitted by one computer system, the data must be compressed to 8-bit words. When PCM data is received from a T1 line, it must be decompressed (for example, from 8 bits to 16 bits) in order to be usable by the receiving computer system.

Some applications, such as video conferencing, require real time data processing of the PCM data sent over telephone lines. One technique used to speed processing is to provide multiple processors in a computer system, wherein each processor can process a portion of the data. However, the compression or decompression process introduces some delay and processing overhead into prior art systems. As well as the need for dedicated look-up tables in memory.

SUMMARY OF THE INVENTION

Briefly, in accordance with the invention an information processing system including a bus and at least one processor coupled to the bus includes a pulse code modulation (PCM) compression unit comprising means for receiving an indication that the processor will not use the bus; means for receiving PCM data; and compressing means for compressing PCM data during a time that the bus is unused by the processor. In accordance with another embodiment of the invention, the information processing system further includes decompression means for decompressing compressed PCM data and means for writing the decompressed PCM data into the memory over the bus, while the decompressing the compressed PCM data and the writing of the decompressed PCM data into the memory occurring during another time that the bus is unused by the processor.

BRIEF DESCRIPTION OF THE DRAWINGS

FIG. 7 is a block diagram showing the transmit encoding multiplexing logic.

FIG. 13 is a table showing the various gains that can be achieved with the logic of FIGS. 12A and 12B.

DESCRIPTION OF THE ILLUSTRATIVE EMBODIMENTS

Figure 1:
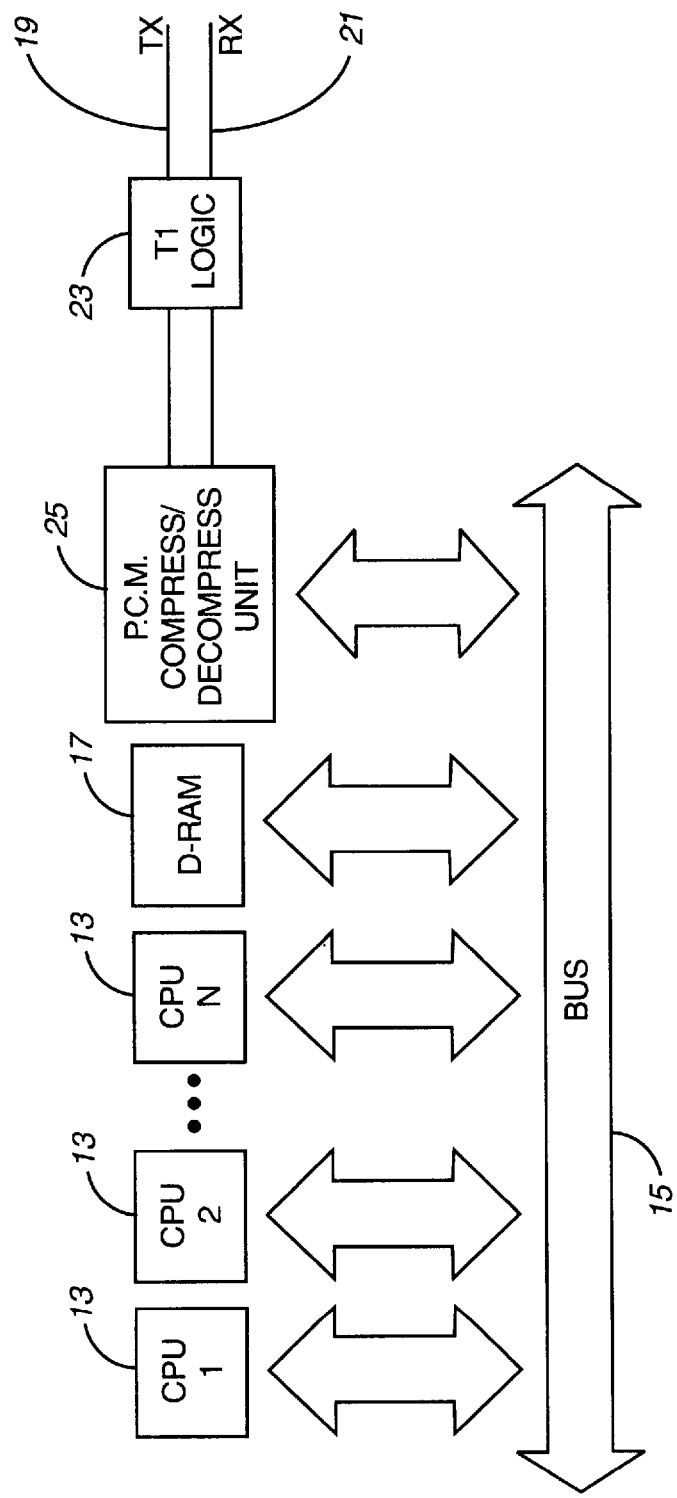
FIG. 1 is a block diagram of a multiprocessing telecommunication subsystem, using the PCM compress and decompress module of the present invention in accordance with a preferred embodiment.

In FIG. 1, there is shown a typical environment for the present invention. FIG. 1 shows a multiprocessing telecommunications subsystem 11. The subsystem 11 has plural central processing units 13, which communicate over a bus 15. There is also memory 17 (e.g., in the form of dynamic random access memory or DRAM, for short). Preferably, the memory 17 is Data-RAM, using the Harvard architecture. The memory 17 is also connected to the bus 15. The memory 17 and the processors 13 interface with transmit (outgoing) and receive (incoming) T1 telephone lines 19, 21 by way of T1 logic 23 and a Pulse Code Modulation (PCM) compress/decompress module 25. The T1 logic 23, which is conventional and commercially available, includes First In First Out (FIFO) buffers. The T1 logic 23 compresses and serializes the compressed PCM data and places it on the transmit line 19. The T1 logic 23 deserializes the serial PCM data from the receive line 21 and places the data into the FIFO buffers.

In the preferred embodiment, the module 25 implements the compression/decompression of PCM data using hardware, so as to provide for real time compression-decompression. In addition, the PCM compress/decompress module 25 performs its compression/decompression conversions on the PCM data passing therethrough in a transparent manner, so as not to cause any delay to the processors or the bus 15. In accordance with the invention, the module 15 reads from and writes data to the memory 17 during a cycle steal operation, wherein the bus is not being used by the processors. Each of the processors provide a signal to indicate whether it will be using the bus during the next bus cycle. Not only is the data read or written to memory, but the conversion on the PCM data takes place during the same cycle.

The module 25 includes various registers. This is because T1 lines carry multiplexed information and therefore have plural channels. In addition, the present invention allows selection of either μ-Law or A-Law compression techniques for each channel. Therefore, referring to FIG. 2, there are shown μ-Law and A-Law enable registers 31, 33, respectively. Each bit in the registers corresponds to a particular time slot or channel on a T1 line. For each function, there are provided high and low registers, with the high register containing bits 31–16 and low register containing bits 15–00. For example, in the low μ-Law register, bit 00 corresponds to time slot 00, and in the high μ-Law register, bit 16 corresponds to time slot 16. When a bit in the μ-Law registers 31 is set, then μ-Law conversion is used for data on the corresponding time slot. That is to say, that μ-Law conversion is used to compress data that is transmitted and decompress data that is received. When a bit in the A-Law enable registers 33 is set, then A-Law conversion is used for the data in the corresponding time slot. That is to say, that A-Law conversion is used to compress the data being transmitted and to decompress the data that is received on the corresponding time slot.

Module 25 further includes even bit inversion enable registers 35. In A-Law encoding (or compression), the even bits are inverted. When a bit in an even bit enable register 35 is set, then for the corresponding time slot, the even bits (6, 4, 2, 0) of the encoded data (8 bits wide) are inverted. The least significant bit of the lower register, bit 00, enables time slot 00, while the least significant bit of the higher register, bit 16, enables time slot 16.

Module 25 also included a set of transmit active time slot status registers 37. There is a bit for each channel, with the least significant bit, bit 00, corresponding to time slot 00. When a bit is set, then the respective time slot is active for processing. Only one bit of both registers is active at any given time, thus indicating that only one time slot is active.

Figure 15A:
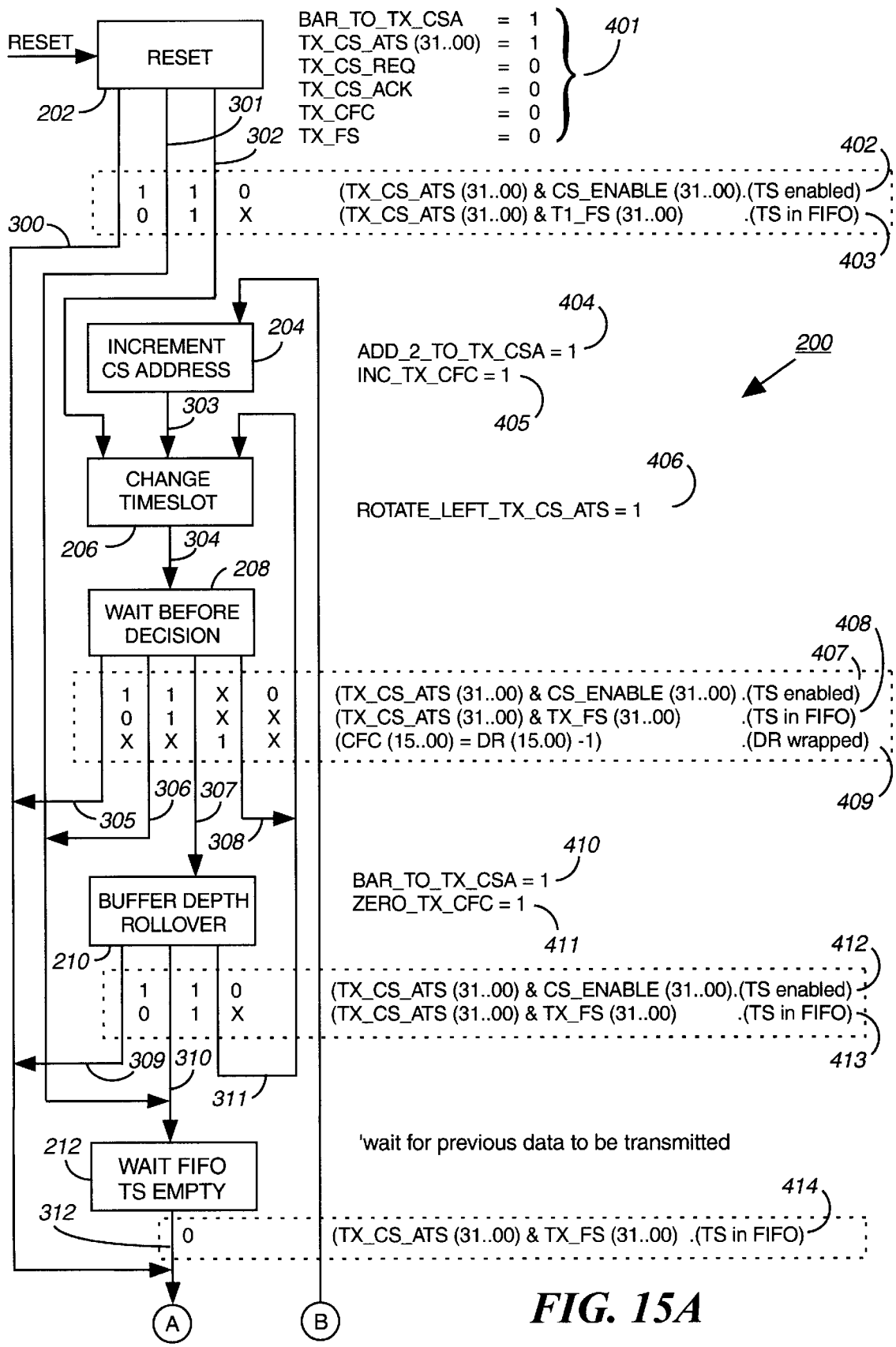
FIGS. 15A and 15B are a block diagram showing a Transmit Finite State Machine Control Logic.
Figure 15B:
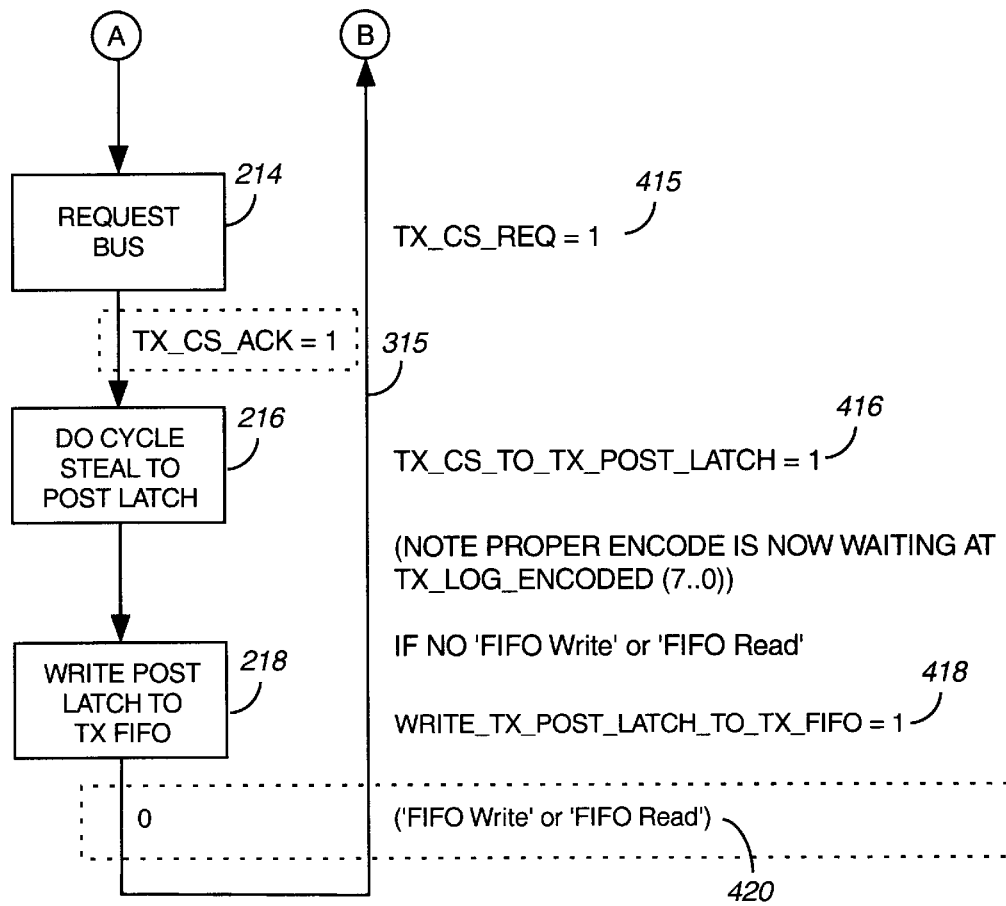

Control logic 40 is provided so as to set the bit of the time slot that is being processed, or alteratively, to step through the time slots in a sequential manner. The control logic is shown in FIGS. 15A and 15B, which combine to form a digital finite state machine (F.S.M.) to control the Timeslot selection register (i.e. the TRANSMIT CS ACTIVE TIMESLOT STATUS REGISTER 421). This F.S.M. also controls the cycle steal process. FIGS. 15A and 15B show how the Transmit half operates. The receive section is very similar and is omitted for brevity. The equations for this F.S.M. are shown below. The registers for this F.S.M. are shown in FIG. 15B.

```
WHEN BAR_TOTX_SA = 1
    TX_CSA(15..00) <-- BAR(15..00)
WHEN ADD_2_TO_TX_CSA = 1
    TX_CSA(15..00) <-- TX_CSA(15..00) ADD 10
WHEN ROTATE_LEFT_TX_CS_ATS = 1
    TX_CS_ATS(31..00) <== TX_CS_ATS(30..00, 31)
WHEN ZERO_TX_CFC = 1
    TX_CFC(15..00) <== 0
WHEN INC_CFC = 1
    TX_CFC(15..00) <== TX_CFC (15..00) ADD 01
WHEN TX_CS_TO_TX_POST_LATCH = 1
    T10_ADDR_BUS(15..01) = TX_CSA(15..01)
    T10_READ = 1
    TX_POST_CS_LATCH_DATA(15..00)<==
    T11_DATA_BUS(15..00)
    TX_POST_CS_LATCH_PARITY(0) <== T11_PARITY(0)
WHEN WRITE_TX_POST_LATCH_TO_TX_FIFO = 1
    TX PORT D ADDRESS =
    TX_CS_WRITE_ADDR(4..0)=ENCODE(TX CS_ATS(31..00)
```

-continued

```
TX PORT D DATA, P = TX_BIT_INV(7..0,P) (hardwired)
MTX_CS_WRITE_XX_XXXX = 1
also
TX_FS(31..00) <== TX_FS(31..00) | TX_CS_ATS(31..00)
```

Block 202 represents the Power on reset state for this state machine. In the state the variables listed to the right 401 are initialized to the indicated values (e.g. BAR_TO_TX_CSA=1).

There are three possible paths the state machine can take from this initial state. If the current timeslot is enabled and the previous 8-bit data placed into the serializer has been transmitted (i.e., the serializer FIFO is empty), path 300 is taken leading to state 214. In this state the TX_CS_REQ line is asserted (i.e. the bus is requested). The Finite State Machine or F.S.M., remains in this state until TX_CS_ACK=1 (i.e., the bus is ready for a cycle). Then state 216 is entered where the data is cycle stolen from the memory location pointed to by TX_CSA, the Transmit Cycle Steal address register, into the Post Latch. The TX_CS_TO_TX_POST_LATCH signal is asserted.

Note at this point the data has just been compressed and is contained in the signals TX_LOG_ENCODED(7..0) (see FIG. 7).

At the next clock cycle the F.S.M. enters state 218 via path 314. In state 218 the data is written into the FIFO location for this channel. The serializer reads the information from the FIFO to be transmitted serially.

In state 218 the state of the Transmit FIFO is examined and if there is not a read and write occurring to the FIFO then WRITE_TX_POST_LATCH_TO_TX_FIFO is asserted and the write will occur. After the write the state 204 is entered via path 315.

In state 204 the Cycle Steal address register is incremented by 2 (ADD_2_TO_TX_CSA=1) in order that the next sequential word address in memory 17 is accessed. Also in state 204, the TX_CFC=TRANSMIT CYCLE STEAL FRAME COUNTER REGISTER is incremented by 1. Then at the next cycle state 206 is entered where the TX CS ACTIVE TIMESLOT REGISTER is rotated by one bit position causing the next time slot to be processed. (ROTATE_LEFT_TX_CS_ATS=1).

Then state 208 is entered when the F.S.M. will wait until the conditions for one of the four paths 305, 306, 307, or 308 becomes true.

Path 308 is taken if this timeslot is not enabled and thus will not be transmitted. (407 is false). The TX_CS_ATS register is then rotated in state 206 and state 208 is then reentered.

Path 305 is taken if The current Timeslot is enabled (407 is true) and the FIFO for this Timeslot is empty (408 is false). State 214 is then entered where the bus is requested and data subsequently is transferred from memory.

Path 306 is taken if The current Timeslot is enabled (407 is true) and the FIFO for this Timeslot is full (408 is true). In this case the F.S.M. will remain in state 212 until the Transmit FIFO location is empty.

Path 307 is taken if the frame counter register is equal to the Cycle steal depth register (DR). (Note that the data in memory 17 is contained in a circular buffer defined by the Base register (BAR) which contains the address of the beginning of the buffer, and the depth register (DR) that defines how deep this buffer is). State 210 is then entered where the Base address register contents are loaded into the Cycle steal address register effecting circular addressing. (see 410 of FIG. 15A). Also, the Frame counter register is cleared (see 411 of FIG. 15A).

Then once in state 210 there are three paths that can be taken: (1) path 309 is taken if The current Timeslot is enabled and the FIFO is empty where state 214 is entered to access the bus, and the FIFO is empty where state 214 is entered to access the bus; (2) path 310 is taken if the current timeslot is enabled (412 is true) and the FIFO for this Timeslot is full (413 is true). In this case the F.S.M. will remain in state 212 until the FIFO location is empty. Path 311 is taken if this timeslot is not enabled and thus will not be transmitted. (condition 412 is false). The TX_CS_ATS register is then rotated in state 206 and state 208 is then reentered.

| | |
|---|---|
| WHEN BAR_TO_TX_CSA = 1<br>  TX_CSA(15..00) <= BAR(15..00) | (1) |
| WHEN ADD_2_TO_TX_CSA = 1<br>  TX_CSA(15..00) <= TX_CSA(15..00) ADD 10 | (2) |
| WHEN ROTATE_LEFT_TX_CS_ATS = 1<br>  TX_CS_ATS(31..00) <= TX_CS_ATS(30..00,31) | (3) |
| WHEN ZERO_TX_CFC= 1<br>  TX_CFC(15..00) <= 0 | (4) |
| WHEN INC_TX_CFC= 1<br>  TX_CFC(15..00) <= TX_CFC(15..00) ADD 01 | (5) |
| WHEN TX_CS_TO_TX_POST_LATCH = 1<br>  'Perform the Memory Read' | (6) |
| WHEN WRITE_TX_POST_LATCH_TO_TX_FIFO = 1<br>  'Perform the I/O Write' | (7) |

The Control Logic 40 requests for use of the bus using standard bus request protocol. External bus arbitration logic can be provided for other devices that may need to access memory. The device that was given control would then access memory when all the CPUs 13 are not accessing memory.

If there are no other such devices then the signal TX_CS_REQ 415 would not be utilized. TX_CS_ACK would be directly asserted if no CPU 13 is accessing memory for the next cycle.

There is also provided a receive active time slot status register 39. There is a bit for each time slot, with the least significant bit, bit 00, corresponding to time slot 00. When a bit is set, then the respective time slot is active for processing. Only one bit of the registers 39 is active at any given time. Control logic, as described above with respect to the transmit active time slot status registers 37, is provided so as to set the bit of the active time slot.

The bits in the enable registers can be set by a user with input devices (such as a keyboard, mouse, etc.) that are connected to the bus. In the preferred embodiment, a particular CPU can access these registers for configuration. In addition to the registers, the module 25 of FIG. 1 includes logic for transmit encoding and for receive decoding of PCM data passing therethrough.

Figure 3:
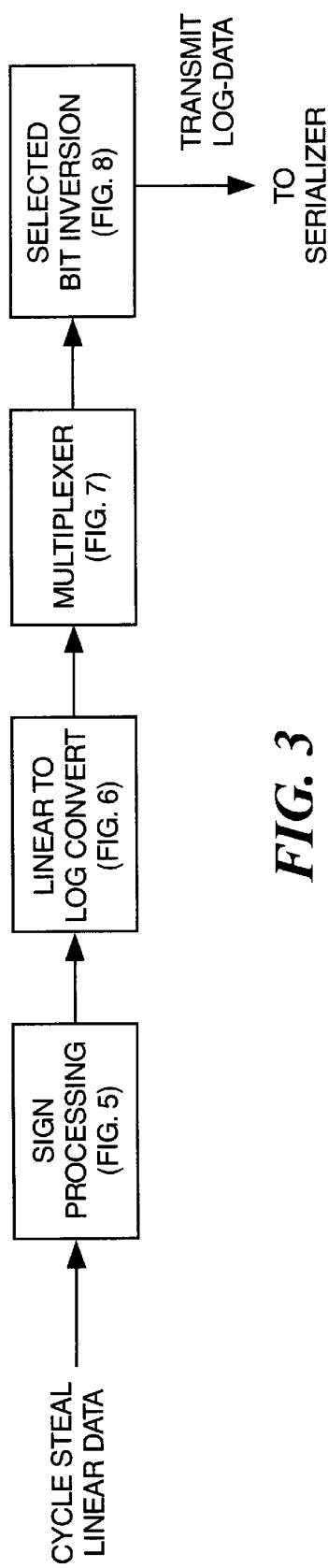
FIG. 3 is a block diagram showing a process for encoding or compression of data for transmission purposes.

An overview of the transmit operation of the module 25 will now be provided, referring to FIGS. 1 and 3. FIG. 3 is a block diagram illustrates transmit encoding. The data which is to be transmitted over the telephone line is read from the memory 17 over the bus 15. Cycle steal techniques are used, where in the data is transferred from memory to the module 25 during cycles when the bus is not in use by any of the processors 13 so as not interfere with or delay the processors 13. The data obtained from the memory 17 is 16 bits and is linear with 13 bits of significance. The first step that is conducted on the data is sign processing, wherein the sign bit of the data is processed. This logic is shown in FIG.

Figure 2:
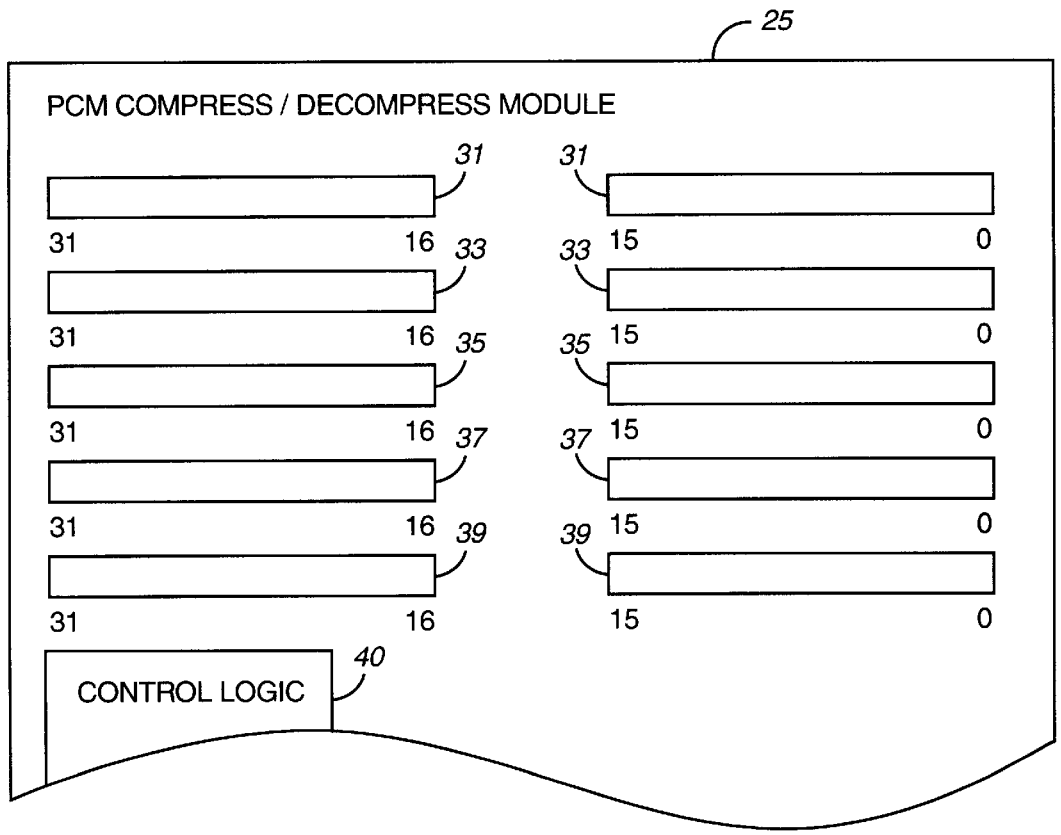
FIG. 2 is a block diagram showing registers in the PCM compress and decompress module.
Figure 6:
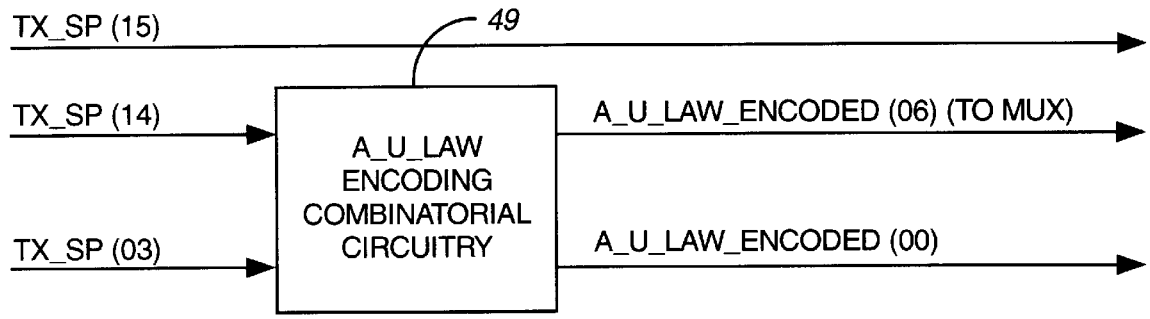
FIG. 6 is a block diagram showing the transmit encoding linear to log conversion logic.
Figure 8:
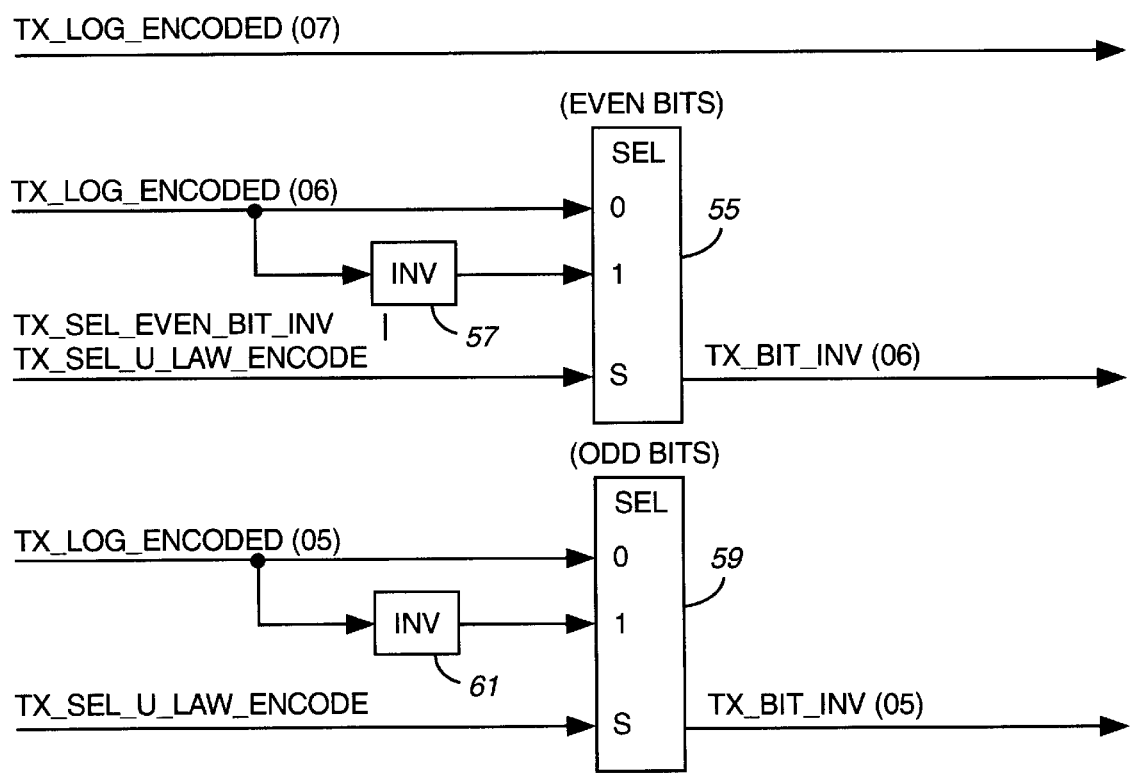
FIG. 8 is a block diagram showing the transmit encoding selective bit inversion logic.

5. The next step is encoding the data from linear to logarithmic. This logic is shown in FIG. 6. A user has a flexibility to choose between A-Law encoding or µ-Law encoding. This selection is provided by the appropriate bit from the registers 31, 33 (FIG. 2). The next step is the selection of either the encoded data (from FIG. 6) or the lower 8 bits of the linear data. This logic is shown in FIG. 7. The user has flexibility of selecting whether to encode the data or to send unencoded data over the telephone line. In many situations, the data to be transmitted may already be in a form suitable for transmitting. For example, in a 16 bit word, the lower 8 bits can be raw data, while the upper 8 bits are unused. In this situation, compression is not needed and the user can choose to avoid compression. This allows PCM data to be mixed with synchronous data link control (e.g. SDLC) data. The last step is the inversion of selected bits. This is logic is shown in FIG. 8. The user is provided with flexibility to choose between inverting or noninverting. After passing through the inversion logic of FIG. 8, the data (which if conversion was used is in logarithmic form) is passed onto the T1 logic 23 (see FIG. 1) and onto to the transmit line 19.

Figure 4:
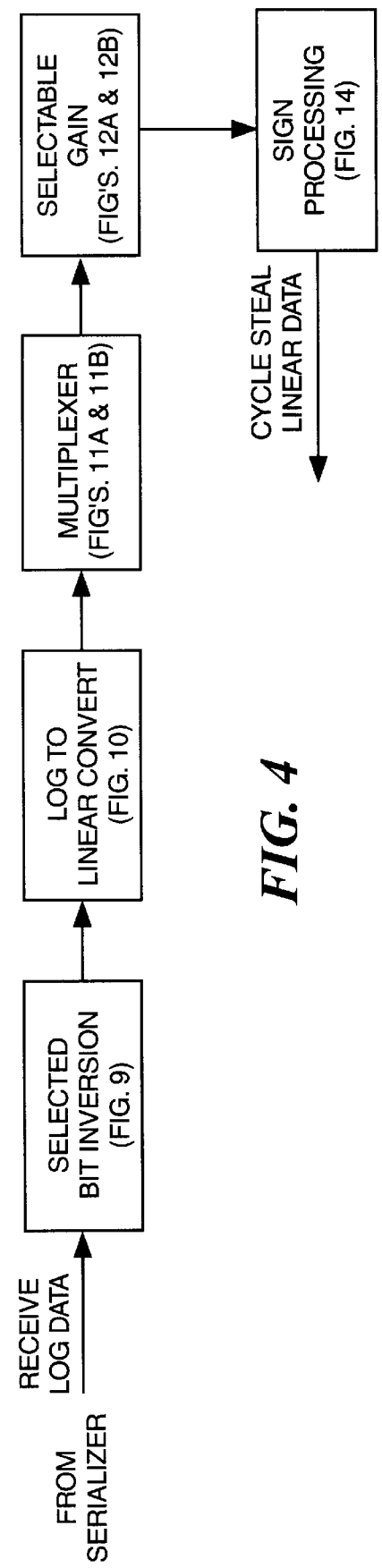
FIG. 4 is a block diagram showing the decoding or decompressing of data for reception purposes.
Figure 9:
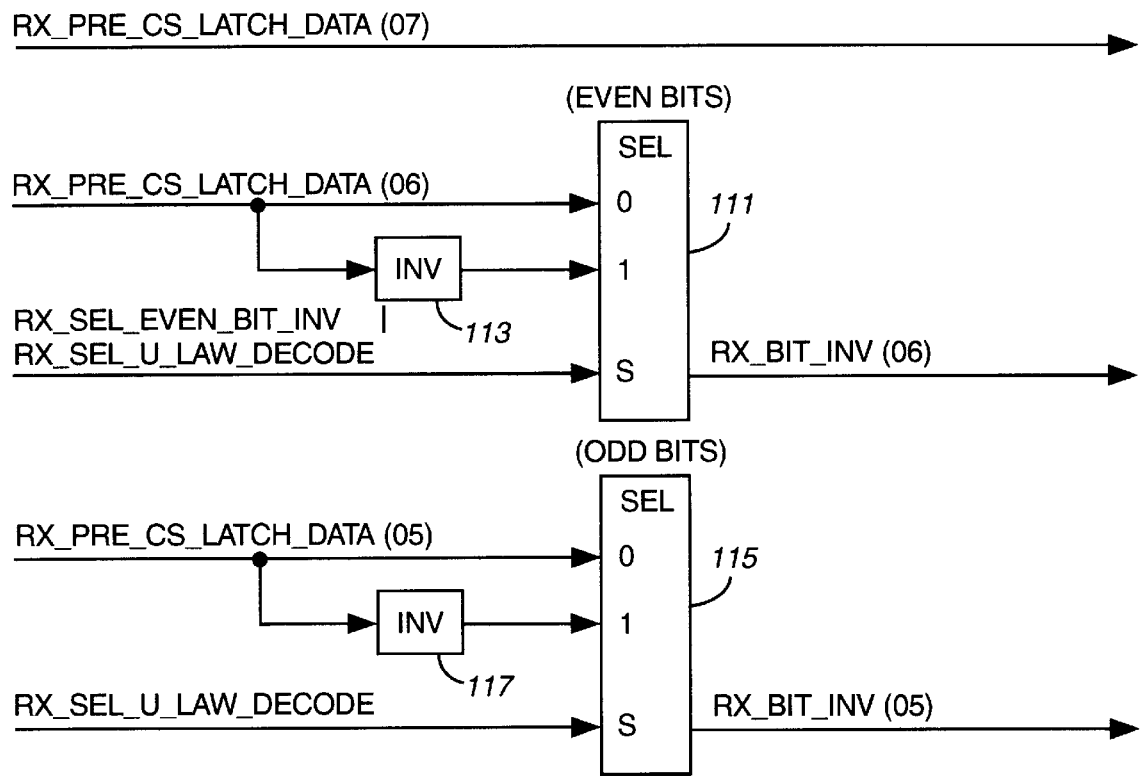
FIG. 9 is a block diagram showing the receive decoding selective bit inversion logic.
Figure 11A:
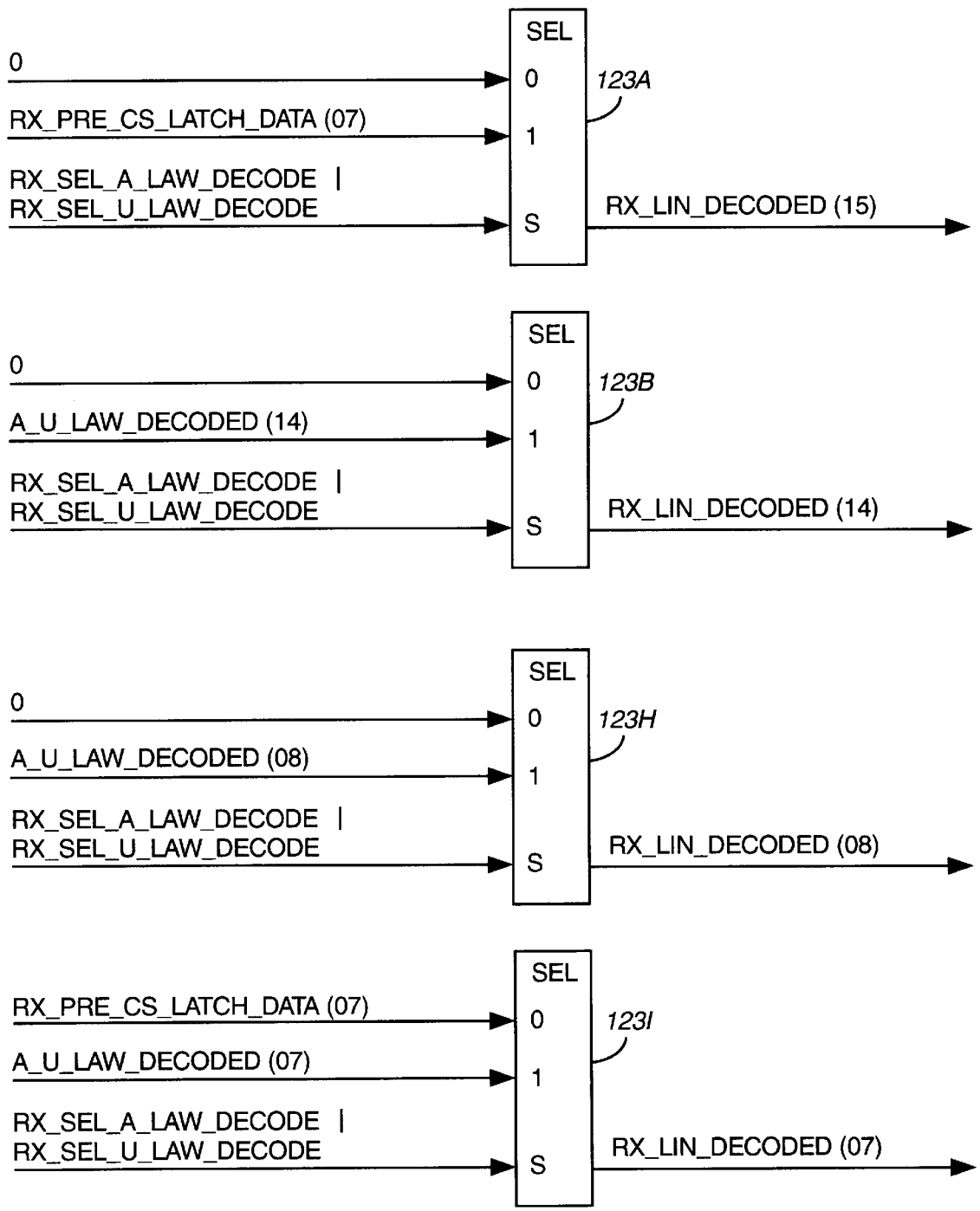
FIGS. 11A and 11B are a block diagrams showing the receive decoding multiplexer logic.
Figure 11B:
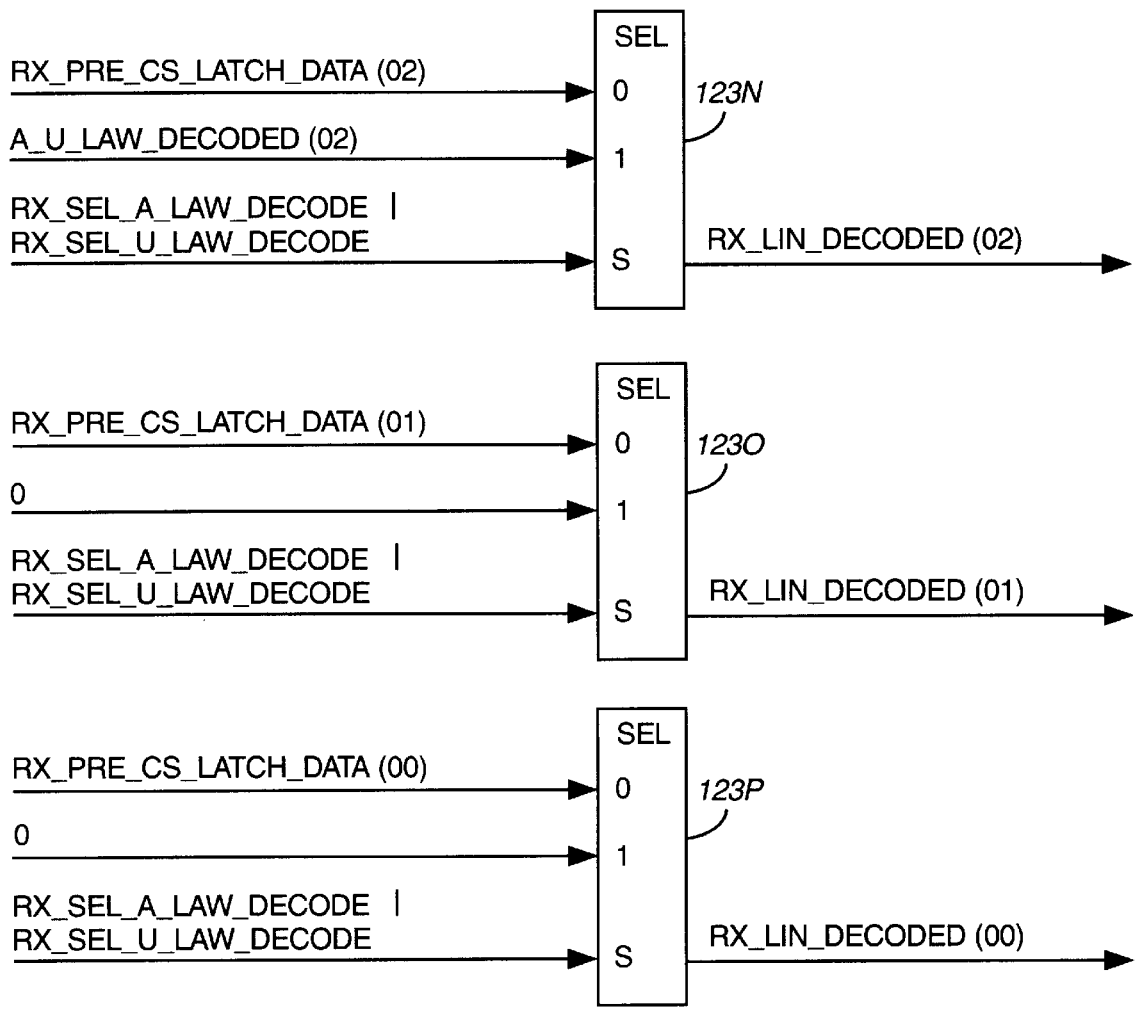
Figure 12A:
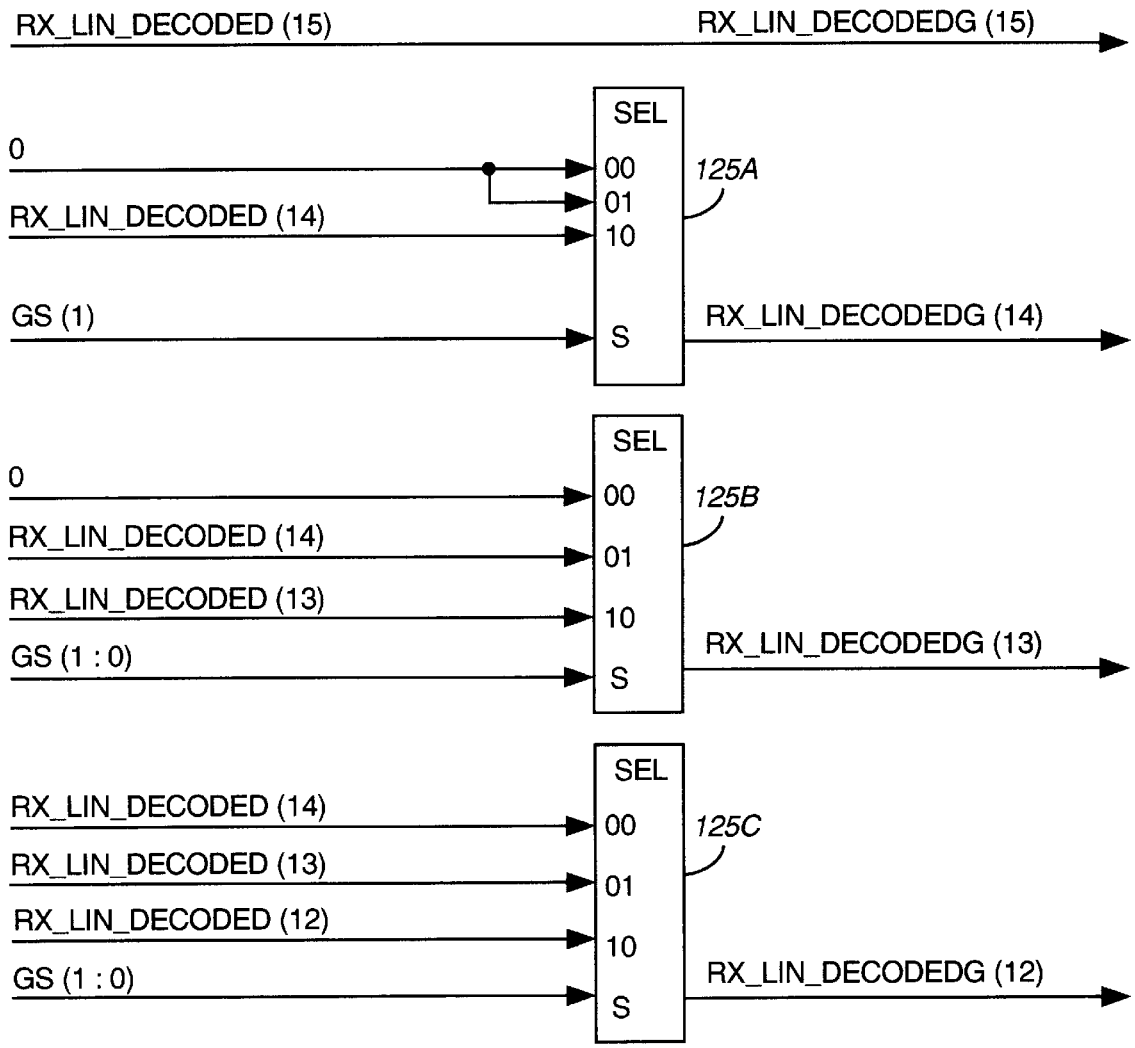
FIGS. 12A and 12B are a block diagrams showing the gain multiplexer logic.
Figure 12B:
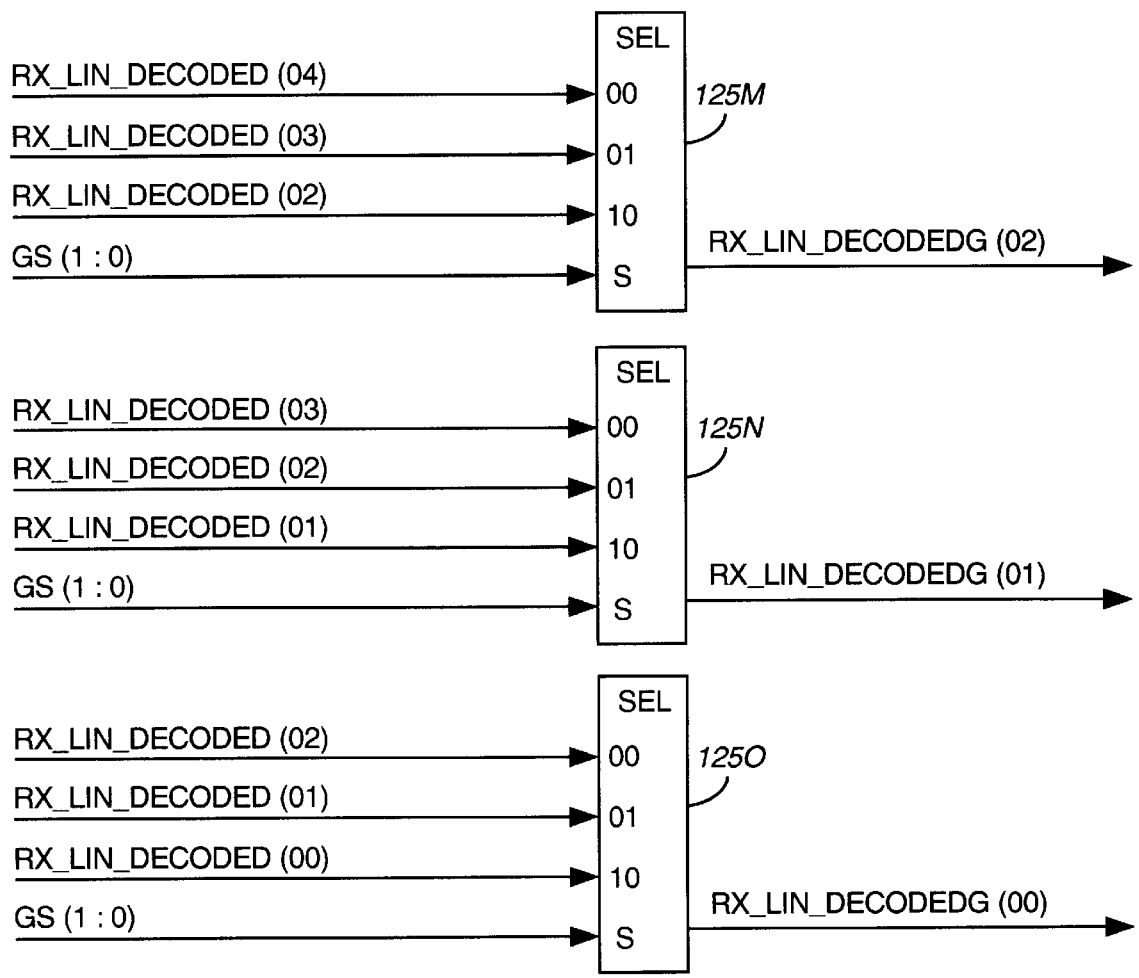

An overview of the receive operation of the module Referring to FIG. 4 is, a block diagram that illustrates receive decoding. The data is obtained the receive line 21 of FIG. 1 and passes through the T1 logic 23. Then, the data has selected bits inverted. This logic is shown in FIG. 9. The next step is to convert the logarithmic data to linear data by way of the logic shown in FIG. 10. Then, the desired data is selected. The user can select between decoded data or the raw (or uncompressed) data that is received from the receive line 21. This selection logic is shown in FIGS. 11A and 11B. Next, the data passes through selectable gain logic that adjusts the gain to a desired level. The gain adjustment is applied to the magnitude portion of the data. The magnitude can be unmodified (a gain of 1), divided by two, or divided by four. The selectable gain logic is shown in FIGS. 12A and 12B. (See also FIG. 13) Next, the data is sign processed, by way of the logic shown FIG. 14. Finally, the data, which if decompressed is been transformed from 8 bit compressed data to 13 bit scaled linear data, is written into the memory 17 over the bus 15 using a cycle steal operation. The data in memory 17 is for use by one of the processors 13.

Now, the transmit mode operation will be described more specifically. In this description, the following signal definitions are used:

| | |
|---|---|
| TX_REQ_A_LAW_ENCODE = | |
| | (A_LAW_ENABLE (31) & TX_CS_ATS(31)\| |
| | (A_LAW_ENABLE (30) & TX_CS_ATS (30)\| |
| | (A_LAW_ENABLE (00) & TX_CS_ATS (00) |
| TX_REQ_U_LAW_ENCODE = | |
| | (U_LAW_ENABLE (31) &TX_CS_ATS(31)\| |
| | (U_LAW_ENABLE (30) & TX_CS_ATS(30)\| |
| | (U_LAW_ENABLE (00) & TX_CS_ATS (00) |
| TX_SEL_A_LAW_ENCODE = | TX_REQ_A_LAW_ENCODE &<br>!TX_REQ_U_LAW_ENCODE |
| TX_SEL_U_LAW_ENCODE = | TX_REQ_U_LAW_ENCODE &<br>!TX_REQ_A_LAW_ENCODE |
| TX_SEL_SIGN_PROCESSED = | TX_SEL_U_LAW_ENCODE \|<br>TX_SEL_A_LAW_ENCODE |
| TX_CS_ATS = TX CS ACTIVE TIME SLOT STATUS REGISTER 37 | |
| A_LAW_ENABLE = A LAW ENABLE REGISTER 33 | |
| U_LAW_ENABLE = U LAW ENABLE REGISTER 31 | |

Because only one bit in the active time slot status register 37 (TX_CS_ATS) can be active at any one time, the TX_REQ_A_LAW_ENCODE determines if A-Law encode has been selected for the active time slot. Likewise, TX_REQ_U_LAW_ENCODE determines if µ-Law encode has been selected for the active time slot.

Figure 5:
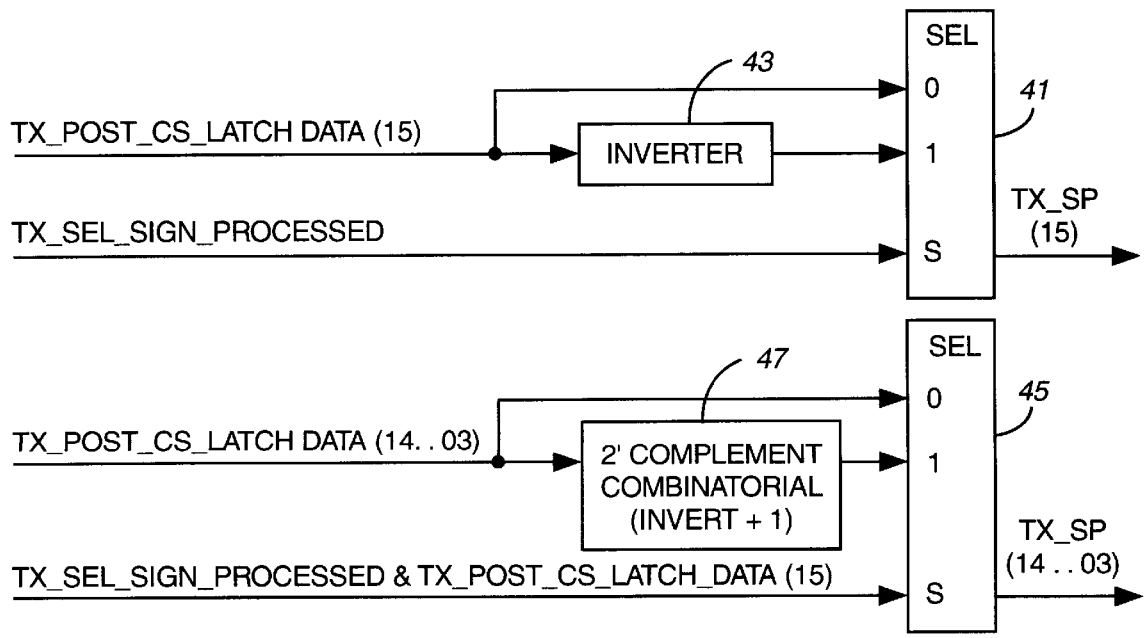
FIG. 5 is a block diagram showing the transmit encoding sign processing logic.

Referring to FIG. 5, the transmit encoding sign processing logic is shown. The 16 bit linear data that is obtained from the memory 17 (see FIG. 1) is shown as TX_POST_CS_LATCH_DATA. The "CS" designates that the data has been cycle stolen from memory 17. This 16 bit word is assigned to an active time slot.

TX_POST_CS_LATCH_DATA (15), which is the 15th bit (the sign bit) is connected directly to the 0 input of a selector 41 (or multiplexer) and also to an input of an inverter 43. The output of the inverter 43 is connected to the 1 input of the selector. TX_SEL_SIGN_PROCESSED is connected to the S (selection) input of the selector 41. TX_SEL_SIGN_PROCESSED is 0 if the following conditions occur: A_LAW_ENABLE for this time slot (the time slot carrying the data which time slot is active) is 0 (that is A-Law enable is not been selected) and _LAW_ENABLE for this time slot is 0 for the active time slot. If TX_SEL_SIGN_PROCESSED is 0, then encoding has not been selected for the active time slot and the sign bit is not inverted. Thus, the output of the selector 41 TX_SP (15)=TX_POST_CS_LATCH_DATA(15). If TX_SEL_SIGN_PROCESSED is 1, then the sign bit is inverted by the inverter 43, and the inverted bit is output as TX_SP(15).

The remaining bits of the 16 bit word, TX_POST_CS_LATCH_DATA (14...00) are provided directly to the 0 input of another selector 45 and, to the 1 input of the selector 45 by way of twos compliment combinatorial logic 47 (which inverts the data and then adds 1). The S input into the selector 45 is TX_SEL_SIGN_PROCESSED & TX_POST_CS_LATCH_DATA (15). Thus, if neither A-Law or $\mu$-Law encoding is selected for the active time slot, then the data is passed through with no further processing and appears on TX_SP (14...03) (the three least significant bits are dropped). However, if either A-Law or $\mu$-Law encoding is selected for the active time slot, and the data represented by bits 14–00 is negative, then the data is processed by the twos compliment combinatorial logic 47 so as to become positive. The output of the combinatorial logic 47 appears on TX_SP (14...03).

After the sign of the data has been processed, the data, TX_SP (15...03) goes to the transmit encoding linear to log conversion logic of FIG. 6. Note that this will process the magnitude of the data. The most significant bit, TX_SP (15) passes through unprocessed. The remaining bits, TX_SP (14...03) are provided to the A_U_LAW encoding combinatorial circuitry 49.

The encoding circuitry 49 combines both A-Law and $\mu$-Law encoding, so as to save logic gates. The encoding circuitry 49 converts the 12 bit input from TX_SP (14...03) to the 7 bit output A_U_LAW_ENCODED (06...03) using A-Law or $\mu$-Law conversions. The logic can be described by the following, which is written in the Synopsis hardware design language:

casez ({tx_sp (14:7), tx_sel_a_law_encoded, tx_sel_u_law_encoded})

| col. # | 1 | 2 | 3 | 4 | 5 |
|---|---|---|---|---|---|
| line # | | | | | |
| 1){8'b00000001, 2'b?1}: | | | a_u_law_encoded(6:0) | = | {3'b000, tx_sp(6:3)}; |
| 2){8'b0000000?, 2'b1?}: | | | a_u_law_encoded(6:0) | = | {3"b000, tx_sp(7:4)}; |
| 3){8'b0000001?, 2'b??}: | | | a_u_law_encoded(6:0) | = | {3'b001, tx_sp(7:4)}; |
| 4){8'b000001??, 2'b??}: | | | a_u_law_encoded(6:0) | = | {3'b010, tx_sp(8:5)}; |
| 5){8'b00001???, 2'b??}: | | | a_u_law_encoded(6:0) | = | {3'b011, tx_sp(9:6)}; |
| 6){8'b0001????, 2'b??}: | | | a_u_law_encoded(6:0) | = | {3'b100,tx_sp(10:7)}; |
| 7){8'b001?????, 2'b??}: | | | a_u_law_encoded(6:0) | = | {3'b101,tx_sp(11:8)}; |
| 8){8'b01??????, 2'b??}: | | | a_u_law_encoded(6:0) | = | {3'b110,tx_sp(12:9)}; |

9){8'b1???????, 2'b??}: a_u_law_encoded(6:0) = {3'b111,tx_sp(13:10)};
10) default: a_u_law_encoded (6:0) = 6'bxxxxxx The inputs (see casez staitment) are TX_SP(14..7), TX_SEL_A_LAW_ENCODED and TX_SEL_U_LAW_ENCODED. The circuitry 49 determines if line 1 is true, and if so, assigns the designated values to the output A_U_LAW_ENCODED (6:0) and no further processing is performed. If line 1 is not true, then line 2 is examined. If line 2 is true, then the output is assigned the designated values and no further processing is performed. If line 2 is not true, then line 3 is examined and so on with remaining lines being examined in sequence until either a true statement is found or until line 10 is reached and the default value is assigned.

Column 1 corresponds to the input TX_SP (14:7). For example, in line 1, column 1 the input is 8'b0000001. Thus, the input TX_SP (14:7) is 8 binary bits having a value of 00000001. Column 2 corresponds to the inputs TX_SEL_A_LAW_ENCODED and TX_SEL_U_LAW_ENCODED. For example, in line 1, column 2 the input is 2'b?1. Thus, the input is two binary bits. The most significant bit corresponds to the input TX_SEL_A_LAW_ENCODED, while the least significant bit corresponds to TX_SEL_U_LAW_ENCODED. A ? means that the value of that bit is insignificant (don't care) in making the statement true or false. Thus, the input 2'b?1 means that $\mu$-Law encoding has been selected. Column 3 is the output A_U_LAW_ENCODED which is 7 bits. Column 4 contains the assigned values for the three most significant bits of the output A_U_LAW_ENCODED. For example, if line 1 is true (such that TX_SP (14:7) equals 00000001 and TX_SEL_U_LAW_ENCODED=1, then A_U_LAW_ENCODED (6:0) equals 000Q3Q2Q1Q0, wherein Q3, Q2, Q1, and Q0 corresponds respectively to bits 6, 5, 4, and 3 of the input TX_SP.

Thus, the encoding circuitry 49 implements $\mu$-Law and A-Law encoding. A-Law and $\mu$-Law encoding are conventional. One source is given in Table 2, page 175 of *Digital Signal Processing Applications with the TMS 320 Family, Theory, Algorithms and Implementations*, Texas Instruments, pages 171–180, 1986 which disclosure is incorporated herein by reference. The encoding for A-Law is given in Table 6, page 179 of the same reference.

$\mu$-Law encoding uses lines 1 and 3–9 of the above synopsis language logic, while A-Law encoding uses lines 2–9.

After the data has been encoded, it is then passed through the transmit encoding multiplexer logic of FIG. 7. The logic of FIG. 7 allows a user to select either encoded data (A_U_LAW_ENCODED (06...00)) or the unencoded data (TX_POST_CS_LATCH_DATA (07...00)).

The multiplexer has 8 selectors 51A, 51B,...51H, one for each bit of data that is to be output. The 0 input of each selector 51 is connected to the respective bit of the unencoded data (TX_POST_CS_LATCH_DATA). For example, the selector 51A for the most significant bit of data has its 0 input connected to TX_POST_CS_LATCH_DATA (07). The 1 input of the selector 51A for the most significant bit is connected to TX_SP (15), which is the sign bit. The 1 input of each of the other selectors 51B...51H is connected to the respective bit of the encoded data (A_U_LAW_ENCODED). For example, the selector 51B for the second most significant bit of data has its 1 input connected to A_U_LAW_ENCODED (06) while the 0 input of the same selector 51B is connected to TX_POST_CS_

LATCH_DATA (06). The S input of each selector 51A...51H is connected to TX_SEL_A_LAW_ENCODE OR TX_SEL_U_LAW_ENCODE.

Thus, if either the μ-Law or A-Law encoding has been selected for the active time slot, then S=1 for all of the selectors and the selectors allow TX_SP(15) and A_U_LAW_ENCODED (06...00) to pass through and appear on output lines TX_LOG_ENCODED (07...00). If neither μ-Law or A-Law encoding has been selected for the active time slot, then S=0 for all of the selectors and the selectors allow TX_POST_CS_LATCH_DATA (07...00) to pass through and appear on output lines TX_LOG_ENCODED (07...00), uncompressed, i.e. raw data.

After the multiplexer of FIG. 7, the data proceeds to the transmit encoding selective bit inversion and logic of FIG. 8. In general, if μ-Law encoding has been selected for the active time slot, then all bits of magnitude (bits 06...00) are inverted. For A-Law encoding, the user can select even bit inversion wherein the even bits are inverted. If even bit inversion has not been selected for the active time slot, and the data is A-Law encoded or not encoded at all, then no bits are inverted.

The most significant bit, TX_LOG_ENCODED (07) passes through the logic of FIG. 8, without being processed. This is because this sign bit is not a bit of magnitude (these compression standards use signed-magnitude number representation). The next most significant bit is TX_LOG_ENCODED (06), which is connected to 0 input of a selector 55 and also to an input of an inverter. The output of the inverter is connected to the one input of the selector. The S input of the inverter is connected to TX_SEL_EVEN_BIT_INV OR TX_SEL_U_LAW_ENCODE, wherein:

TX_SEL_EVEN_INV = (EVEN_BIT_INV (31) & TX_CS_ATS (31)|
    (EVEN_BIT_INV (30) & TX_CS_ATS (30)|
    (EVEN_BIT_INV (00) & TX_CS_ATS (00)|
EVEN_BIT_INV = EVEN BIT INVERSION ENABLE REGISTER 35

Thus, when a user has selected even bit inversion (by setting the bit in the even bit inversion enable registers 35 (FIG. 2) for the active time slot to 1), or the user has selected μ-Law encoding, then S equals 1 for the selector 55 and TX_LOG_ENCODED (06) is inverted. The inverted bit appears on the output line TX_BIT_INV (06). However, if the user does not select either even bit inversion or μ-Law encoding for the active time slot, then S equals 0 and the bit is not inverted.

The other even bits (TX_LOG_ENCODED (04, 02, 00)) are processed in the same manner as bit 06. Thus, there is a separate selector and inverter for each of other even bits.

The odd bits are processed in a slightly different manner. For example, bit 5 is processed as shown in FIG. 8. TX_LOG_ENCODED (05) is connected to the 0 input of a selector 59 and also to the input of an inverter 61. The output of the inverter is connected to the one input of the selector 59. The S input of the selector is connected to TX_SEL_U_LAW_ENCODE, which is defined above. If the user selects μ-Law encoding for the active time slot (by setting the respective bit in the μ-Law enable registers 31 (FIG. 2)), then S equals 1 and the bit is inverted. The inverted bit appears as the output TX_BIT_INV (05). If μ-Law encoding is not been selected for the active time slot then S equals 0 and the bit is not inverted. TX_LOG_ENCODED (05) merely appears as the output TX_BIT_INV (05).

The other odd bits (03, 01) are processed in the same manner as bit 5, using their own respective selectors and inverters.

The output of the inversion logic of FIG. 8 is TX_LOG_ENCODED (07) and TX_BIT_INV (06...00). This output is provided to the T1 logic 23 of FIG. 1 wherein the 8 bit data word is transmitted over the transmit line 19 in serial fashion.

Now the receive decode operation will be described more specifically. The data is received from the receive digital PCM line 21 of FIG. 1 and processed by the T1 logic 23. The data is deserialized, placed into a receive FIFO, and provided as RX_PRE_CS_LATCH_DATA (07...00) to the receive decoding selective bit inversion logic of FIG. 9.

In general, if μ-Law has been selected for the active time slot, then all bits of magnitude are inverted. If the user has selected even bit inversion, then the even bits are inverted for either A-Law encoding or for no encoding.

The most significant bit, RX_PRE_CS_LATCH_DATA (07) is passed through the logic of FIG. 9 unprocessed, because it is a sign bit, not a magnitude bit. The next most significant bit RX_PRE_CS_LATCH_DATA (06), which is connected to the 1 input of the selector 111 and also to an input of an inverter 113. The output of the inverter 113 is connected to the 1 input of the selector 111. The S input of the selector is connected to RX_SEL_EVEN_BIT_INV OR RX_SEL_U_LAW_DECODE, wherein:

RX_SEL_EVEN_BIT_INV =
    (EVEN_BIT_INV (31) & RX_CS_ATS (31)|
    (EVEN_BIT_INV (30) & RX_CS_ATS (30)|
    (EVEN_BIT_INV (00) & RX_CS_ATS (00)
EVEN_BIT_INV = EVEN BIT INVERSION ENABLE REGISTER 35
RX_REQ_A_LAW_DECODE =
    (A_LAW_ENABLE (31) & RX_CS_ATS (31)|
    (A_LAW_ENABLE (30) & RX_CS_ATS (30)|
    (A_LAW_ENABLE (00) & RX_CS_ATS (00)
RX_REQ_U_LAW_DECODE =
    (U_LAW_ENABLE (31) & RX_CS_ATS (31)|
    (U_LAW_ENABLE (30) & RX_CS_ATS (30)|
    (U_LAW_ENABLE (00) & RX_CS_ATS (00)
RX_SEL_A_LAW_DECODE = RX_REQ_A_LAW_DECODE &
    !RX_REQ_U_LAW_DECODE
RX_SEL_U_LAW_DECODE = RX_REQ_U_LAW_DECODE &
    !RX_REQ_A_LAW_DECODE
RX_SEL_SIGN_PROCESSED = RX_SEL_U_LAW_DECODE|
    RX_SEL_A_LAW_DECODE
RX_CS_ATS = RX CS ACTIVE TIME SLOT STATUS REGISTER 39
A_LAW_ENABLE = A LAW ENABLE REGISTER 33
U_LAW_ENABLE = U LAW ENABLE REGISTER 31

Thus, when a user has selected even bit inversion (by setting the bit in the even inversion enable register 35 (FIG. 2) for the active time slot to 1), or the user has selected μ-Law encoding, then S equals 1 for the selector 111 and RX_PRE_CS_LATCH_DATA (06) is inverted. The inverted bit appears on the output line RX_BIT_INV (06). However, if the user does not select either even bit inversion or μ-Law encoding for the active time slot, then S equals 0 and the bit is not inverted. Thus, RX_PRE_CS_LATCH_DATA (06) appears on the output line RX_BIT_INV (06).

The other even bits (RX_PRE_CS_LATCH_DATA (04, 02, 00)) are processed in the same manner as bit 06. Thus, there is a selector and an inverter for each of the other even bits.

The odd bits are processed in slightly different manner. For example, bit 5 is processed as shown in FIG. 9. RX_PRE_CS_LATCH_DATA (05) is connected to the 0 input of a selector 115 and also to the input of an inverter 117. The output of the inverter 117 is connected to the 1 input of the selector 115. The S input of the selector is connected to RX_SEL_U_LAW_DECODE, which is defined above. If the user selects μ-Law encode for the active time slot (by setting the respective bit in the μ-Law enable register 31 FIG. 2), then S=1 and the bit is inverted. Then inverted bit appears as the output RX_BIT_INV (05). If μ-Law encoding has not been selected for the active time slot, the S=0 and the bit is not inverted. RX_PR_CS_LATCH_DATA (05) merely appears as the output RX_BIT_INV (05).

The other odd bits (03, 01) are processed in the same manner as bit 05, using their own respective selectors and inverters.

The output of the inversion logic of FIG. 9 is RX_PRE_CS_LATCH_DATA (07) and RX_BIT_INV (06...00). These are provided to the receive log to linear conversion logic of FIG. 10. The most significant bit, RX_PRE_CS_LATCH_DAT (07) passes through the logic of FIG. 10 unprocessed. The remaining bits, are RX_BIT_INV (06...00) are provided to an A_U_Law decoding combinatorial circuitry 121.

Figure 10:
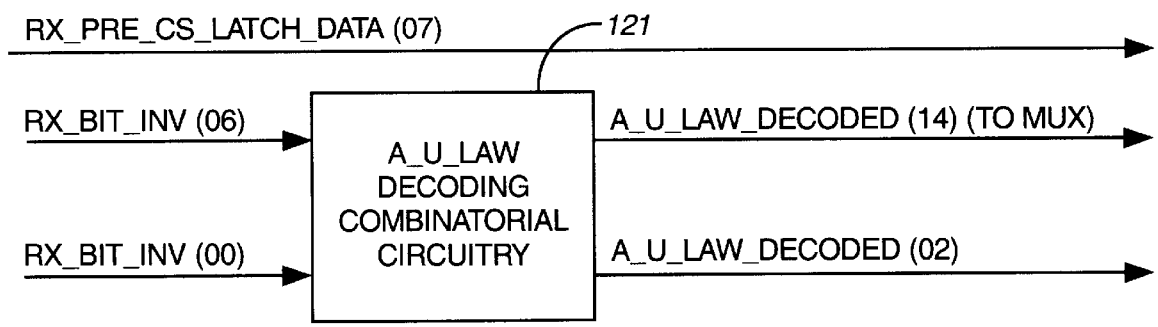
FIG. 10 is a block diagram showing the receive logarithmic to linear conversion logic.

As with the encoding circuitry 49 of FIG. 8, the decoding circuitry of FIG. 10 combines both A-Law and μ-Law encoding so as to save logic gates. The decoding circuit converts the 8 bit input to a 16 bit output. The logic can be described as the following, which is synopsis language:

```
casez ({rx_bt_inv(6:4),
rx_sel_u_law_decode,rx_sel_a_law_decode})
1){3'b000,2'b1?}:a_u_law_decoded(14:2)=
            {8'b00000001,rx_bit_inv(3:0),1'b1    }; //u_law
2){3'b000,2'b01}:a_u_law_decoded(14:2)=
            {7'b0000000, rx_bit_inv(3:0),1'b10   }; //a_Law
3){3'b001,2'b??}:a_u_law_decoded(14:2)=
            {7'b0000001, rx_bit_inv(3:0),1'b10   };
4){3'b010,2'b??}:a_u_law_decoded(14:2)=
            {6'b000001, rx_bit_inv(3:0),1'b100   };
5){3'b011,2'b??}:a_u_law_decoded(14:2)=
            {5'b00001, rx_bit_inv(3:0),1'b1000   };
6){3'b100,2'b??}:a_u_law_decoded(14:2)=
            {4'b0001, rx_bit_inv(3:0),1'b10000   };
7){3'b101,2'b??}:a_u_law_decoded(14:2)=
            {3'b001, rx_bit_inv(3:0),1'b100000   };
8){3'b110,2'b??}:a_u_law_decoded(14:2)=
            {2'b01, rx_bit_inv(3:0),1'b1000000   };
9){3'b111,2'b??}:a_u_law_decoded(14:2)=
            {1'b1, rx_bit_inv(3:0),1'b10000000   };
endcase
```

The inputs are RX_BIT_INV (6...4), RX_SEL_U_LAW_DECODE and RX_SEL_A_LAW_DECODE. The output is A_U_LAW_DECODED (14...2). The decoding circuit 121 operates in the same manner as the encoding circuit 49 of FIG. 6 described above, in that line 1 is first examined, and if found to be true, then the output values are assigned to the output. If line 1 is not true, then the next lines are sequentially taken up until a true statement is found, wherein the respective output values are assigned to the output A_U_LAW_DECODED (14...2).

Column 1 corresponds to the input RX_BIT_INV (6:4). For example, in line 1, column 1 is 3'b000. Thus, the input RX_BIT_INV (6:4) is 3 binary bits having a value of 000 (that is bits 6–4 are 000). Column 2 corresponds to the inputs RX_SEL_U_LAW_DECODE and RX_SEL_A_LAW_DECODE. For example, in line 1, column 2 is 2'b1?. Thus, the input is 2 binary bits. The most significant bit corresponds to RX_SEL_U_LAW_DECODE, while the least significant bit corresponds to RX_SEL_A_LAW_DECODE. A ? means that the value of that bit is insignificant (don't care) in making the statement true or false. Column 3 is the output A_U_LAW_DECODED (14:2), wherein bits 01 and 00 are ignored. The output has 3 portions. The most significant bits are provided by the first portion, which are in column 4. The middle portion is provided by column 5. The third portion, which are the least significant bits, are provided by column 6. For example, if line 1 is true (wherein RX_BIT_INV (6:4)=000 and RX_SEL_U_LAW_DECODE=1), then the output A_U_LAW_DECODED (14:2)=00000001Q3Q2Q1Q01. Q3, Q2, Q1, Q0 are whatever the bit values are of RX_BIT_INV (3:0). Thus, the decoding circuitry implements the μ-Law and A-Law decoding.

μ-Law decoding utilizes lines 1 and 3–9, while A-Law encoding utilizes lines 2–9 of the synopsis language above.

After the data has been decoded, it is then passed through the receive decoding multiplexer logic of FIGS. 11A and 11B. The logic of FIGS. 11A and 11B allow a user to select either the decoded data (A_U_LAW_DECODED (14...02)) or the undecoded data (RX_PRE_CS_LATCH_DATA (07...00)).

The multiplexer logic has 16 selectors 123A...123P, one for each bit of the data that is to be output. The 0 inputs for the selectors 123A...123P for the most significant 8 bits are tied to 0. The 0 inputs of the selectors for the 8 least significant bits are connected to RX_PRE_CS_LATCH_DATA (07...00). For example, the selector 123I for bit 07 is connected to RX_PRE_CS_LATCH_DATA (07). The 1 input of the selector 123A for bit 15 is connected to RX_PRE_CS_LATCH_DATA (07). This is sign bit. The one inputs of the selectors 123B...123N for bits 14–02 are connected to the respective inputs A_U_LAW_DECODED (14...02). The 1 input of the selectors 123O and 123P for bits 01 and 00 are tied to 0. The S inputs of all of the selectors 123A...123P are connected to RX_SEL_A_LAW_DECODE OR RX_SEL_U_LAW_DECODE. The output of each selector is RX_LIN_DECODED. Thus, the selector for the most significant bit has an output of RX_LIN_DECODED (15). If the user selects either A-Law decode or μ-Law decode (by setting the appropriate bit in the A-Law enable register 33 or the μ-Law enable register 30, 31 of FIG. 2, for the active time slot), then S=1 for all of the selectors and the A_U_LAW_DECODED bits pass through the selectors and appear as the output RX_LIN_DECODED. The most significant bit of RX_LIN_DECODED is the sign bit, while the two least significant bits are set to 0. If neither μ-Law or A-Law decoding have been selected for the active time slot, then the raw data which has not been decoded by the logic of FIG. 10 (and has bypassed the logic of FIG. 10) is passed through the multiplexer. The 8 most significant bits of RX_LIN_DECODED are 0, while the least significant bits are set to the raw data received from the telephony or TDM.

The gain of the data can be adjusted. This is done by providing the output of the multiplexer of FIGS. 11A and 11B to the input of the selectable gain logic of FIGS. 12A and 12B. The logic of FIGS. 12A and 12B allows the adjustment of gain for all of the magnitude bits. Thus, the most significant bit, RX_LIN_DECODED (15) passes through unprocessed (although it is renamed RX_LIN_DECODED G (15)).

The gain is set by GS, which has the following values:

```
GS = 10 gain of 1
GS = 01 gain of ½
GS = 00 gain of ¼
```

Referring to FIG. 13, when the gain is 1, then no processing of the data is performed by the logic of FIGS. 12A and 12B. When the gain is ½, the data is right shifted by 1 bit (that is, the data is shifted towards the least significant bit). Thus, information in bit 14 is now in bit 13, and so on. Bit 14 is set at 0. When the gain is ¼, then the data is right shifted from its configuration when the gain=1 by 2 bits. Thus, the information in bit 14 is now in bit 12 and soon. Bits 14 and 13 are both set at 0.

This implemented by the logic of FIGS. 12A and 12B. A selector 125A...125N is provided for each of bits 14–00. The S input of each selector is connected to GS. Each has 3 data inputs, namely 00 (gain of ¼), 01 (gain of ½), and 10 (gain of 1). The 10 input of the ith selector is connected to RX_LIN_DECODED (i). The 01 input of the ith selector is connected to RX_LIN_DECODED (i+1), except for the selector 125A for bit 14, which has its 01 input connected to 0. The 00 input of the ith selector is connected to RX_LIN_DECODED (i+2), except for the selectors 125A, 125B for bits 14 and 13, which have their 00 inputs connected to 0. The output of the ith selector is RX_LIN_DECODEDG (i).

Figure 14:
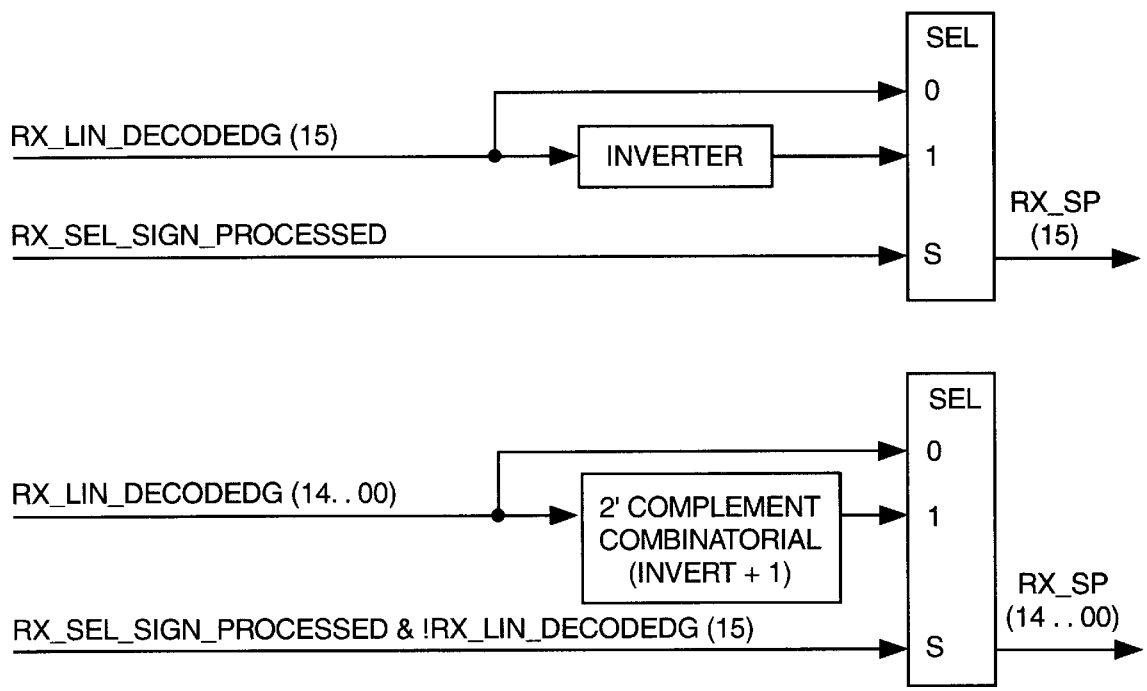
FIG. 14 is a block diagram showing the receive decoding sign processing logic.

The outputs, RX_LIN_DECODEDG (15...0), of the selectable gain logic of FIGS. 12A and 12B are provided to the receive decoding sign processing logic of FIG. 14. The most significant bit, RX_LIN_DECODEDG (15) is provided to the 0 input of a selector 127 and also to the input of an inverter 129. The output of the inverter 129 is provided to the 1 input of the selector 127. The S input of the selector 127 is connected to RX_SEL_SIGN_PROCESSED. If either µ-Law or A-Law has been enabled for the active time slot (as determined from the registers 31, 33 of FIG. 2), then S=1 and the most significant bit is inverted. The inverted bit appears as RX_SP (15). If neither µ-Law or A-Law has been selected for the active time slot, then the most significant bit is not inverted and RX_LIN_DECODEDG (15) appears as the output RX_SP (15).

The magnitude bits (14...00) are connected the 0 input of another selector 131 and also to the input of twos compliment combinatorial logic 133. The S input for the selector 131 is RX_SEL_SIGN_PROCESSED AND !RX_LIN_DECODED (15). Thus, if neither A-Law or µ-Law have been selected for the active time slot and the data represented by bits 14=00 is positive, then the data is passed through the selector 131 with no further processing and appears on RX_SP (14...00). However, if either A-Law or µ-Law have been selected for the active time slot and the data represented by bits 14–00 is negative (as the defined by the sign bit (bit 15)), then the data is processed by the twos compliment combinatorial logic 133 so as to become negative and appears on RX_SP (14...00).

The data RX_SP (15...00) is then cycle stolen into the memory 17 for further processing.

An additional advantage of the invention is the ability to access both µ-Law and A-Law signals and process them to allow interformat conversion for intercontinental trunks. This advantage will be most useful in voice over data and ATM-based switched networks.

The foregoing disclosure and the showings made in the drawings are merely illustrative of the principles of this invention and are not to be interpreted in a limiting sense.

What is claimed is:

1. An information processing system comprising:
   a) a bus;
   b) a processor that is coupled to the bus, the processor including means for providing an indication that the processor will not use the bus;
   c) a memory, coupled to the bus;
   d) a pulse code modulation (PCM) unit, connected to the bus, for processing unprocessed PCM data, the PCM unit comprising: receiving means for receiving the indication that the processor will not use the bus; and compression means for compressing uncompressed PCM data during a time wherein the data is being transferred to memory and during such a time that the bus is unused by the processor.

2. The system of claim 1, further comprising:
   decompression means for decompressing compressed PCM data and means for writing the decompressed PCM data into the memory over the bus, with the decompressing the compressed PCM data and the writing of the decompressed PCM data into the memory occurring during another time that the bus is unused by the processor.

3. The system of claim 1, wherein the compression means compresses the uncompressed PCM data using µ-Law and A-Law conversions and further comprising a single means for encoding the uncompressed PCM data according the µ-Law and A-Law conversions.

4. The system of claim 2, wherein the decompression means comprises means for decompressing the compressed PCM data using µ-Law and A-Law conversions, further comprising a single means for decoding the compressed PCM data according to µ-Law and A-Law conversions.

5. The system of claim 2, wherein;
   a) the system has plural channels, each of which can carry PCM data;
   b) means for enabling a selected one of the channels and for disabling the other unselected channels;
   c) the compression means compresses the uncompressed PCM data and the means for decompressing decompresses the compressed PCM data using either µ-law conversion or A-Law conversion;
   d) means for selecting either µ-Law conversion or A-Law conversion for each of the channels.

6. The system of claim 2, wherein:
   a) the means for compressing system comprises means for compressing the uncompressed PCM data using A-Law conversion and the means for decompressing comprises means for decompressing the compressed PCM data using A-Law conversion;
   b) both of the uncompressed PCM data and the compressed PCM data have even bits;
   c) means for selecting whether the even bits of the compressed PCM data or the uncompressed PCM data are to be inverted.

7. The system of claim 2, further comprising means for processing a sign of the compressed PCM data before the compressed PCM data is decompressed and means for processing a sign of the compressed PCM before the uncompressed PCM data is compressed.

8. The system of claim 2, further comprising a transmitter multiplexer for selecting either of the compressed PCM data or first raw data for transmitting and a receiver multiplexer for the selecting either the compressed PCM data or second raw data.

9. The system of claim 1 further comprising at least one additional processor connected to the bus.

10. The system of claim 2 further comprising means for selecting a gain of the decompressed PCM data that has been decompressed from compressed PCM data, the means for selecting a gain being connected to the means for decompressing PCM data.

11. The system of claim 2, further comprising T1 logic means coupled to the PCM unit for receiving the PCM data, serializing it and modulating the PCM data for transmission.

12. The system of claim 11, wherein the T1 logic comprises at least one transmit and receive FIFO register for storing the PCM data before being serialized and transmitted.

13. The system of claim 12, further comprising means for examining a status for the transmit and receive FIFO registers.

14. In an information processing system including a bus and at least one processor and a memory coupled to the bus, a pulse code modulation (PCM) processing unit comprising:

means for receiving an indication that the processor will not use the bus;

means for receiving PCM data; and compressing means for compressing uncompressed PCM data during a time that the bus is unused by the processor.

15. The processing unit of claim 14, further comprising decompression means for decompressing compressed PCM data and means for writing the decompressed PCM data into the memory over the bus, with the decompressing the compressed PCM data and the writing of the decompressed PCM data into the memory occurring during another time that the bus is unused by the processor.

16. The processing unit of claim 14, wherein the compression means further comprises means for compressing the uncompressed PCM data using $\mu$-Law and A-Law conversions and further comprising a single means for encoding the uncompressed PCM data according the $\mu$-Law and A-Law conversions.

17. The processing unit of claim 15, wherein the means for decompressing comprises means for decompressing the compressed PCM data using $\mu$-Law and A-Law conversions, further comprising a single means for decoding the compressed PCM data according to $\mu$-Law and A-Law conversions.

18. The processing unit of claim 15, wherein;

a) the system has plural channels, each of which can carry PCM data;

b) means for enabling a selected one of the channels and for disabling the other unselected channels;

c) the compression means compresses the uncompressed PCM data and the means for decompressing decompresses the compressed PCM data using either $\mu$-law conversion or A-Law conversion;

d) means for selecting either $\mu$-Law conversion or A-Law conversion for each of the channels.

19. The processing unit of claim 15, wherein:

a) the means for compressing compresses the uncompressed PCM data using A-Law conversion and the means for decompressing decompressed the compressed PCM data using A-Law conversion;

b) both of the uncompressed PCM data and the compressed PCM data have even bits;

c) means for selecting whether the even bits of the compressed PCM data or the uncompressed PCM data are to be inverted.

20. The processing unit of claim 14, further comprising means for processing a sign of the compressed PCM data before the compressed PCM data is decompressed and means for processing a sign of the compressed PCM before the uncompressed PCM data is compressed.

21. The processing unit of claim 14, further comprising a transmitter multiplexer for selecting either of compressed PCM data or first raw data for transmitting and a receiver multiplexer for the selecting either the compressed PCM data or second raw data.

22. The processing unit of claim 15, further comprising means for selecting a gain of the decompressed PCM data that has been decompressed from compressed PCM data, the means for selecting a gain being connected to the means for decompressing PCM data.

23. The processing unit of claim 15 further comprising means for allowing an external logic to control a current active timeslot register.

24. The processing unit of claim 15, further comprising means to provide data to be cycle stolen to/from memory.

25. The processing unit of claim 15, further comprising control logic for controlling the current active timeslot register, said logic including a transmit and receive first in first out (FIFO) registers.

* * * * *